Jan. 21, 1969  G. E. PLATZER, JR., ET AL  3,423,578
TRUE ROOT-MEAN-SQUARE COMPUTING CIRCUIT
Filed Aug. 29, 1966
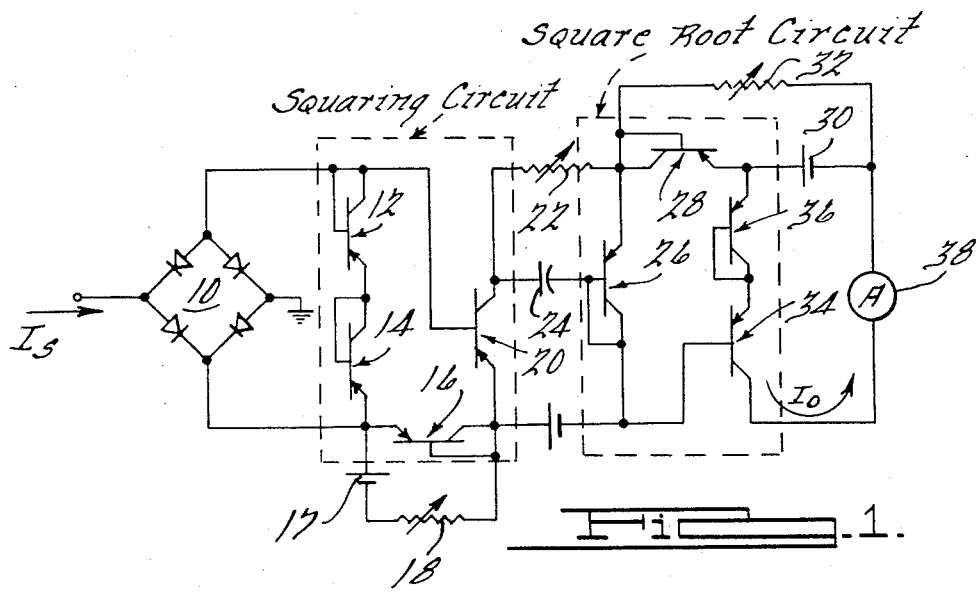
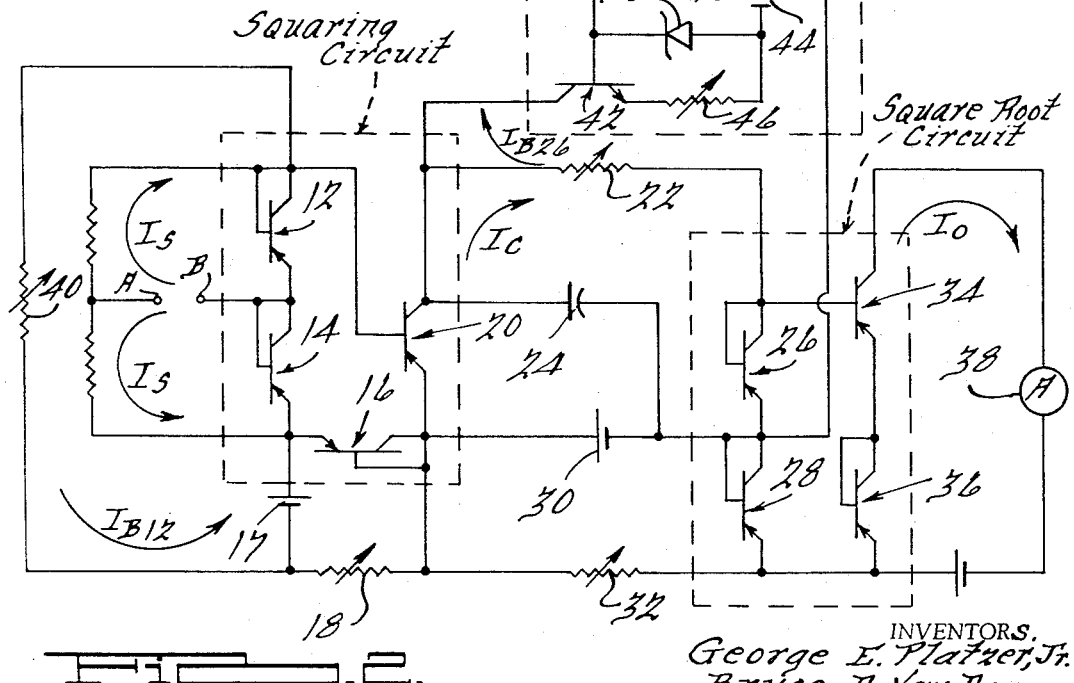
INVENTORS.
George E. Platzer, Jr.
Bruce D. Van Deusen
BY
Harness, Dickey and Baldwin
ATTORNEYS.

3,423,578
TRUE ROOT-MEAN-SQUARE COMPUTING CIRCUIT

George E. Platzer, Jr., Southfield, and Bruce D. Van Deusen, Birmingham, Mich., assignors to Chrysler Corporation, Highland Park, Mich., a corporation of Delaware
Filed Aug. 29, 1966, Ser. No. 575,634
U.S. Cl. 235—193.5                                   7 Claims
Int. Cl. G06g 7/20

ABSTRACT OF THE DISCLOSURE

An analog computing circuit calculating the square root of the average value of the square of an electrical signal and yielding the true RMS values thereof. The circuit comprises a signal receiving squaring circuit including transistor type logarithmic and antilogarithmic translating devices, a square root determining circuit including transistor type antilogarithmic and logarithmic translating devices and an averaging RC circuit connected between the squaring circuit and the square root determining circuit, whereby an RMS output signal is provided from the square root determining circuit.

---

This invention relates generally to computing and measuring circuits and, more particularly, to a RMS circuit for calculating the square root of the average value of the square of a current or voltage.

There exists a need for a simple yet reliable means for measuring or calculating R.M.S. values. It is particularly important that the circuit employed will provide means for selectively weighting the average so that it is exponentially weighted. This permits control of the output so that the more recent values of the observations contribute more strongly than the values occurring in the more distant past.

Accordingly, it is an object of our invention to provide an R.M.S. computer circuit in which the average value of the square of the signal is capable of being selectively weighted with respect to time.

It is a further object of our invention to provide an improved R.M.S. computer circuit in which the range of input signals allowable is a relatively broad one.

It is a still further object of our invention to provide an improved R.M.S. computer circuit capable of handling input signals of both polarities.

The foregoing statements are merely illustrative of the various aims and objects of the present invention. Additional objects and advantages will become apparent from the following specification when considered in conjunction with the accompanying drawings in which like numerals refer to like components and in which:

FIGURE 1 is a schematic of one form of our invention; and

FIGURE 2 is a schematic of our invention in a modified form.

With more particular reference to FIGURE 1, it will be seen that the basic elements of the circuit include a diode bridge rectifier 10, a squaring circuit, an averaging network comprising resistor 22 and capacitor 24, and a square root circuit. The circuit incorporates as logarithmic translating devices transistors having the same exponential characteristics which operate entirely in the logarithmic domain. The squaring circuit is substantially similar to that shown and described by Platzer U.S. Patent 3,197,626, entitled, "Logarithmic Multiplier-Divider," issued on July 27, 1965 in FIGURE 4 thereof. The square root circuit is substantially similar to that shown and described by Platzer U.S. Patent 3,152,250, entitled, "Circuit for Performing the Combined Functions of the Extraction of Roots, Multiplication, and Division," issued on Oct. 6, 1964 in FIGURE 6 thereof. Reference is made to those patents for an explanation of the theory of operation of those circuits. A signal input $I_s$ is provide to rectifier 10. In the FIGURE 1 circuit, transistors 12 and 14 are used as the input or logarithmic determining elements of the circuit. Transistor 16 with its DC source 17 and resistor 18 is included to minimize the effect of temperature drift and high currents. The collectors of transistors 12, 14, and 16 are connected to their respective bases. The result of this connection is to greatly improve the match between the current-voltage characteristics of the input transistors 12 and 14 to those of the output or antilogarithmic determining transistor 20. Since the signal input $I_s$ is rectified and applied across the emitter-base junction of both transistor 12 and 14, the output taken from the collector of transistor 20 represents the square of the quantity $I_s$. Intermediate the squaring circuit and the square root circuit is a resistor-capacitor averaging network comprising variable resistor 22 and capacitor 24. It is important that the RC network have a time constant variable such as by the adjustment of resistor 22. Alternately, the value of capacitor 24 may be selectively adjusted to vary the time constant. The importance of this feature in the operation of the circuit will be further explained in the section entitled "Description of Operation," hereinafter.

The output of the averaging network is applied across the base-emitter junction of transistor 26 which comprises the input element or logarithmic translating device of the square root circuit. In a like manner to transistor 16 and its associated bias network, transistor 28 is included in the circuit with bias source 30 and resistor 32 to minimize the effect of temperature drift and high currents. Transistors 34 and 36 are coupled as shown to complete the final stage of the square root circuit. Transistor 34 functions as the antilogarithmic translating device and transistor 36 functions as the root determining logarithmic translating device connected in the output circuit of transistor 34. The output of this stage $I_o$ is representative of the square root of the average value of the square of the input $I_s$. Transistors 34 and 36 may be two in number and function as the logarithmic translating means in the circuit to complete the square root taking. The current output signal may be passed through a suitable indicator means such as ammeter 36. The circuit of FIGURE 1 is capable of handling input signals of relatively high DC levels.

FIGURE 2 shows an alternate embodiment of the FIGURE 1 circuit. The FIGURE 2 circuit is capable of accepting inputs of both polarities without using the rectifier of FIGURE 1. The input signal $I_s$ is applied across terminals A–B. This effectively places the same input across the base-emitter junction of transistors 12, 14. Accordingly, $I_s$ increases conduction in transistor 14 at the same time it decreases conduction in transistor 12. A resistor 40 and bias source 17 provide a superimposed biasing current $I_{B12}$. The collector output current of transistor 20 may be represented as follows:

$$I_c = K(I_{B12}+I_s)(I_{B12}-I_s)$$
$$= K(I^2_{B12}-I_s^2)$$

wherein $K=$ a constant.

The output of the squaring circuit is seen to produce a current proportional to the bias current squared, $I^2_{B12}$ and from this is subtracted a current proportional to the signal current squared $I_s^2$. To isolate the term $KI_s^2$, the $KI^2_{B12}$ term must be subtracted from $I_c$. This is accomplished by the constant current source poled as shown to produce $I_{B26}$ which has a value equal to $KI^2_{B12}$ and of an opposite direction of flow. This constant current source includes a transistor 42 having a DC source 44, variable resistor 46, fixed resistor 48, and a Zener diode 50 connected as shown. The averaging network comprising a RC network with capacitor 24 and variable resistor 22 averages the output of the squaring circuit. Having averaged $I_c$ and removed the steady state term, it is now necessary to take the square root of the remaining current $KI^2_s$ (av.). The square root of this average is than taken by the final square root stage. The output $I_o$ thus represents the R.M.S. value of the original current input signal $I_s$.

*Description of operation*

The basic operation of the squaring circuit depends on the use of solid state logarithmic and antilogarithmic devices which have the same exponential characteristics as discussed in the above-mentioned patents. In the circuits shown in this application, the transistors used are PNP. However, with appropriate changes in bias sources and polarity, NPN transistors may be substituted.

Attention must be given to the exact nature of the R.M.S. measurement of which the present inventive circuits are capable. In the study of an aperiodic function, it is frequently necessary to observe the effective value of changes which are exponentially time weighted. In this manner, emphasis may be made on the more recent of the changes occurring. With reference to the averaging circuit comprising resistor 22 and capacitor 24, the following basic circuit equation can be written:

$$\frac{dV_o(t)}{dt} = \frac{1}{RC}[V_i(t) - V_o(t)]$$

In this equation, $V_i(t)$ represents the input voltage to the RC network and $V_o(t)$ represents the output voltage. Both voltages are functions of time (t). The solution of the above equation in the integral form is as follows:

$$V_o(t) = \frac{1}{RC}\int_{\infty}^{t} V_i(t) e^{\frac{\tau-t}{RC}} d\tau$$

wherein $\tau$ is the variable of integration.

This equation demonstrates that the average with which we are concerned is one which is exponentially time weighted. Values measured more than three time constants in the past have negligible contribution to the final R.M.S. value.

The circuit of FIGURE 1 includes a full wave rectifier 10 to produce a unindirectional current for the squaring circuit. This is necessary because, while the input signal may be either positive or negative, the squaring circuit can accept currents only in the direction of current flow normal for the emitter-base diode of input transistors 12, 14. The collector current of transistor 20 is proportional to the square of $I_s$. The averaging of this value is accomplished by means of the parallel combination of capacitor 24 with the series arrangement of resistor 22 and transistor 26. As has above been indicated, the value of capacitor 24 and the resistance of resistor 22 determine the time constant of the averaging circuit. The current flowing through transistor 26 is proportional to the average value of the square of the input current $I_s$. The square root of the current flowing through transistor 26 is computed by the operation of transistors 26, 28, 34 and 36. A visual output of the R.M.S. value of the input current $I_s$ is then provided by ammeter 38. The circuit of FIGURE 2 has a mode of operation essentially similar to the FIGURE 1 circuit except that it has been modified to handle input signal currents of either polarity. A biasing current is initially added and subsequently subtracted at a proper stage to enable this mode of operation.

It will be appreciated by those skilled in the art that this invention is subject to modification in its details through substitution of other types of electronic or electrical devices for the logarithmic and antilogarithmic translating devices disclosed.

It will thus be seen that we have provided by our invention a new and improved R.M.S. computer circuit with important features particularly adapting it for a broad variety of uses.

We claim:

1. A circuit for computing the R.M.S. value of an input signal comprising a pair of logarithmic translating devices connected in a series additive relationship, a rectifier connected across said devices and adapted to receive said input signal, an antilogarithmic determining device operatively connected across said logarithmic translating devices for providing an output representative of the square of said input, an averaging RC network connected to said output, a logarithmic translating device connected to the output of said averaging network, an antilogarithmic translating device and a root determining logarithmic translating device operatively connected across said last-mentioned logarithmic translating device for providing an output representative of the square root of said output of said averaging network, each of the aforesaid translating devices having substantially the same exponential, current-voltage characteristics, said logarithmic translating devices comprising transistors each having a collector, an emitter and a base electrode with the base electrode of each transistor connected to its respective collector electrode, said antilogarithmic translating devices comprising transistors of like conductivity type to said transistor logarithmic translating devices, said RC network being adjustable for selectively adjusting its time constant.

2. A circuit for computing the R.M.S. value of an input signal comprising a pair of transistors connected in series additive relationship, each of said transistors having a base, an emitter, and a collector and having its base connected to its collector, a rectifier connected across said transistors and adapted to receive said input signal, a transistor having a base, an emitter and a collector, and having said first-mentioned transistors connected across its base-emitter diode to provide an output through its collector representative of the square of said input current, an averaging RC network connected to said collector, a transistor having a base, an emitter, and a collector, said last-mentioned transistor having its base-emitter diode connected across said network and its base and collector connected, and a pair of like poled transistors operatively connected across said last-mentioned transistor, each of said pair having a base, an emitter and a collector, one of said pair having its base connected to its collector and the other of said pair operable to provide an output through its collector representative of the square root of the output of said averaging network.

3. The combination as set forth in claim 2 wherein said RC network includes a variable resistor for selectively adjusting its time constant to determine the input signals averaged.

4. A circuit for measuring the R.M.S. value of an input signal comprising a pair of logarithmic translating devices serially connected and of like polarity, a pair of input terminals operatively connected in common across each of said devices and adapted to receive said input signal, means for providing a constant DC biasing current across said devices to provide operation with input signals of both polarity, an antilogarithmic translating device operatively connected across said devices and operable to provide an output representative of the input signal squared, an averaging network of the RC type connected to the output of said antilogarithmic device, a logarithmic translating device operatively connected to the output of said averaging network, means for subtracting a DC current from said averaging network output equal to the square of said DC biasing current, an logarithmic translating device and a root determining logarithmic device operatively connected across said last-mentioned logarithmic translating device for providing an output representative of the square root of the remaining output of said averaging network, each of the aforesaid translating devices having substantially the same exponential, current-voltage characteristics.

5. The combination as set forth in claim 4 wherein said logarithmic translating devices comprise transistors, each having a collector, an emitter and a base and having its base connected to its collector.

6. The combination as set forth in claim 4 wherein said RC network includes a variable resistor for selectively adjusting its time constant to determine the number of cycles over which averaging is accomplished.

7. The combination as set forth in claim 4 wherein said antilogarithmic translating devices comprise transistors of like polarity to said logarithmic translating devices.

References Cited

UNITED STATES PATENTS

| | | | |
|---|---|---|---|
| 2,965,300 | 12/1960 | Radley et al. | 235—193 |
| 2,871,447 | 1/1959 | Hall | 235—193 |
| 3,182,503 | 5/1965 | Corcoran | 235—183 X |

MALCOLM A. MORRISON, *Primary Examiner.*

J. F. RUGGIERO, *Assistant Examiner.*

U.S. Cl. X.R.

307—229